United States Patent [19]

Naimpally

[11] 4,376,953
[45] Mar. 15, 1983

[54] SIGNAL SEPARATION NETWORKS

[76] Inventor: Saiprasad V. Naimpally, 9133 Bourbon St., Indianapolis, Ind. 46236

[21] Appl. No.: 85,312

[22] Filed: Oct. 26, 1979

[51] Int. Cl.³ .......................... H04N 5/62; H04N 5/60
[52] U.S. Cl. ...................................... 358/197; 350/196
[58] Field of Search ................. 358/197, 188, 196, 38; 333/132, 175, 176

[56] References Cited

U.S. PATENT DOCUMENTS

| 2,504,662 | 4/1950 | Dome | 358/197 |
| 2,652,447 | 9/1953 | Crosby | 358/197 |
| 2,811,580 | 10/1957 | Avins | 358/31 |
| 3,358,246 | 12/1967 | Bensasson | 358/196 |

Primary Examiner—John C. Martin

[57] ABSTRACT

A bridged-T network is provided which functions as both a trap circuit for the intercarrier sound signal in the video signal path, and a take-off network for the sound processing circuitry in a television receiver. A bandpass filter, tuned to the intercarrier sound signal frequency, has an input, and an output coupled to the input of the sound processing circuitry. A detector is provided for producing detected video frequency and intercarrier sound signals. First and second signal paths are coupled between the output of the detector and the input of video processing circuitry, the second signal path including a first reactive impedance element of one sign. A third signal path is coupled between the second signal path and the input of the bandpass filter and includes a second reactive impedance element of an opposite sign. A fourth signal path is coupled between the junction of the third signal path and the input of the bandpass filter and a point of reference potential, and has an impedance which is significantly less than the impedance of the third signal path at the intercarrier sound signal frequency. The four signal paths comprise a tuned circuit which attenuates the intercarrier sound signal at the input of the video processing circuitry. The combined sound trap and take-off network is tuned by varying a single adjustable inductor in the shunt leg of the network.

9 Claims, 5 Drawing Figures

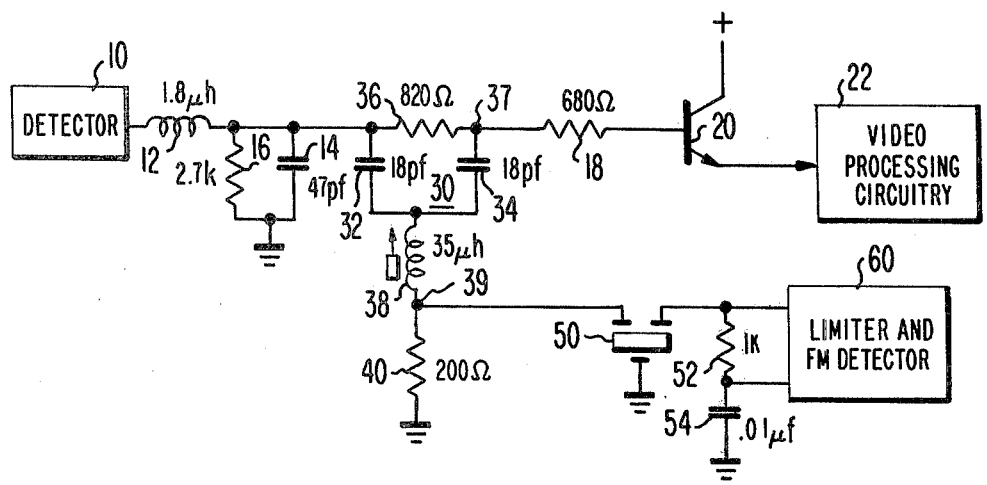
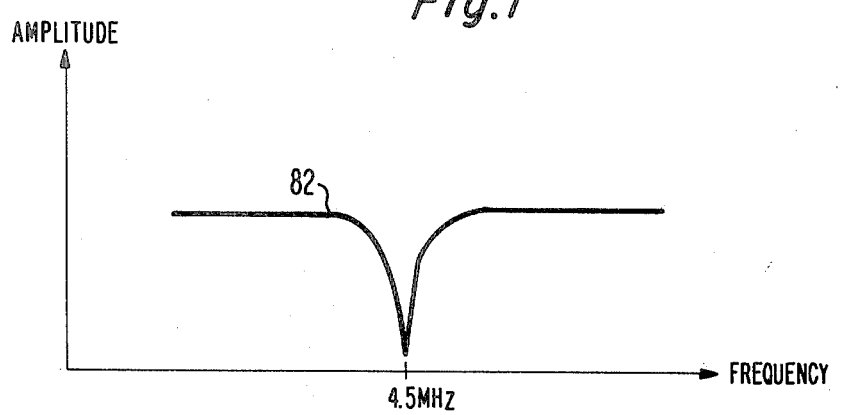
Fig.1
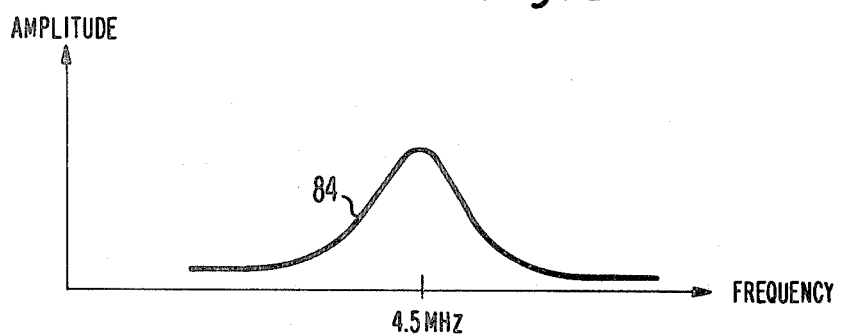
Fig.2a
Fig.2b

SIGNAL SEPARATION NETWORKS

This invention relates to signal separation networks and, in particular, to tuned circuit networks which separate composite video and intercarrier sound signals from a common signal path in a television receiver.

In color television receivers of the intercarrier sound variety, the sound and picture intermediate frequency signals may be amplified in a common signal processing stage. The composite video signal is then detected in an amplitude modulation detector, and an intercarrier sound signal is detected by mixing the picture carrier and the frequency-modulated sound carrier.

A synchronous demodulator may be used for the simultaneous detection of both the composite video and intercarrier sound signals. This is due to the substantially linear operation of the synchronous demodulator, which prevents undesired intermodulation of the intercarrier sound and color subcarrier signals during the detection process. The synchronous demodulator will thus produce both the composite video signal and the intercarrier sound signal at a single output terminal.

Following the common detection of the composite video and intercarrier sound signals, it is necessary to separate the two signals so that the sound and video information may be further processed and reproduced. The intercarrier sound signal must be removed from the video signal to prevent possible intermodulation of the video and intercarrier sound signals during the processing of the composite video signal. Similarly, the video information must be eliminated from the intercarrier sound signal to prevent the generation of intermodulation and harmonic distortion in the sound channel.

In typical arrangements of the prior art, the detected intercarrier sound and video signals are coupled to the sound processing circuitry by a sound take-off network. The sound take-off network may exhibit a certain amount of selectivity at the intercarrier sound frequency so as to suppress the video signal components relative to the intercarrier sound signal. The intercarrier sound signal is then usually applied to a bandpass filter, which further attenuates the video signal components. The resultant bandpassed signal can then be processed without undesirable intermodulation of the video and intercarrier sound signals.

The detected intercarrier sound and video signals are also coupled to the luminance and chrominance processing circuits by way of a signal path which includes an intercarrier sound trap circuit. The video signals may then be processed without the generation of undesirable intermodulation between the sound and video signals, one form of which is the visible beat pattern caused by intermodulation of the intercarrier sound and chrominance subcarrier signals.

A particular type of network which is well suited for the intercarrier sound trap is the "bridged-T" network. One form of this network is characterized by a parallel resonant circuit in series with the video signal path, and an impedance in shunt with the video signal path. The shunt impedance is used to balance the parallel resonant circuit, so as to effect maximum cancellation at the intercarrier sound frequency. In a second form of the network, a parallel R-C circuit in series with the video signal path is tuned and balanced by reactive and resistive impedances in the shunt leg. In both forms, the network is known as a cancellation-type network, since signals at the tuned frequency at the output junction of the two parallel circuit paths are in an antiphase relationship and hence trapped out of the video signal path. An example of the use of a bridged-T network of the first form as an intercarrier sound trap is shown in U.S. Pat. No. 2,811,580, issued to Jack Avins. The Avins arrangement provides an additional feature, in that the intercarrier sound signal is inductively coupled from the parallel resonant circuit of the network for application to the sound processing circuitry.

In accordance with the principles of the present invention, a bridged-T network is provided which functions as both a trap circuit for the intercarrier sound signal in the video signal path, and a take-off network for the sound processing circuitry. A bandpass filter, tuned to the intercarrier sound signal frequency, has an input, and an output coupled to the input of the sound processing circuitry. A detector is provided for producing detected video frequency and intercarrier sound signals. First and second signal paths are coupled between the output of the detector and the input of video processing circuitry, the second signal path including a first reactive impedance element of one sign. A third signal path is coupled between the second signal path and the input of the bandpass filter and includes a second reactive impedance element of an opposite sign. A fourth signal path is coupled between the junction of the third signal path and the input of the bandpass filter and a point of reference potential, and has an impedance which is significantly less than the impedance of the third signal path at the intercarrier sound signal frequency. The four signal paths comprise a tuned circuit which attenuates the intercarrier sound signal at the input of the video processing circuitry. The network is tuned by varying a single adjustable inductor in the shunt leg of the network.

A ceramic filter may be employed as the bandpass filter at the input to the sound processing circuitry. In that instance, the fourth signal path comprises a resistive impedance element which is effectively in shunt with the input impedance of the ceramic filter. The bridged-T network is thereby configured so as to provide a relatively broad and deep trap at the intercarrier sound signal frequency at the input to the video processing circuitry, and the ceramic filter is driven from a sufficiently low impedance to provide a relatively high input signal level to the ceramic filter and the sound processing circuitry.

Alternatively, a simple LC circuit, tuned to the intercarrier sound frequency, may be used as the bandpass filter. The LC tuned circuit has been found to have decreased rejection at the color subcarrier frequency, which can result in intermodulation distortion in the sound channel. In this configuration, the fourth signal path comprises a reactive impedance element which provides increased rejection of the color subcarrier signal at the intercarrier sound take-off point. The bridged-T network is arranged to provide a desired driving impedance for the LC tuned circuit as well as improved color subcarrier rejection. The resulting combination provides a higher level input signal to the sound processing circuitry than the ceramic filter embodiment, which improves the sound-quieting performance of the television receiver.

In the drawings:

FIG. 1 illustrates, partially in block diagram form and partially in schematic diagram form, a signal separation network constructed in accordance with the principles of the present invention to drive a ceramic bandpass filter in the sound channel;

FIGS. 2a and 2b illustrate response curves of the network of FIG. 1.

Figure 4:
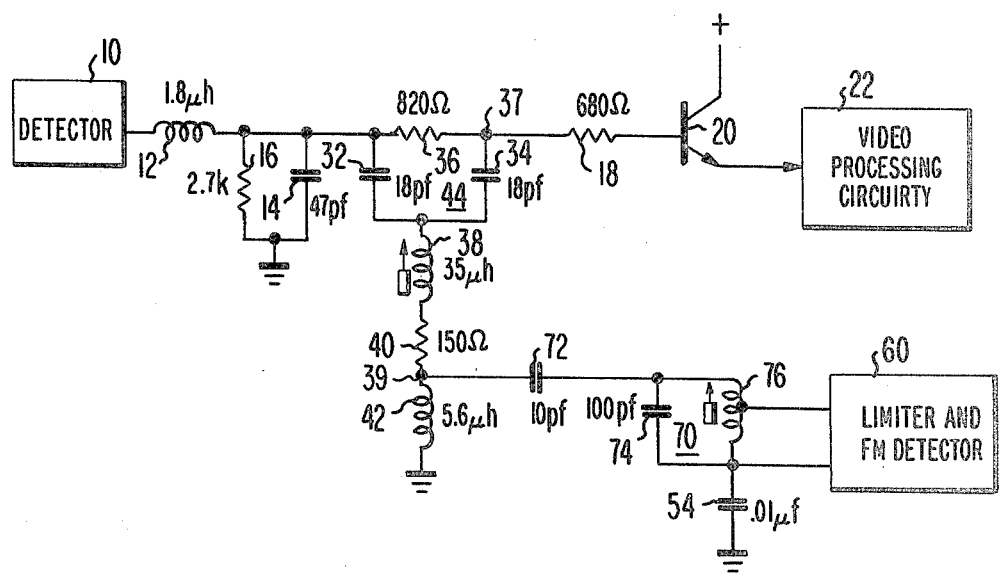
FIG. 4 illustrates, partially in block diagram form and partially in schematic diagram form, a signal separation network constructed in accordance with the principles of the present invention to drive a discrete bandpass filter in the sound channel.

Referring to FIG. 1, a detector 10 is shown which produces detected video and intercarrier sound signals at its output. The output of the detector 10 is coupled by way of a series inductor 12 to a bridged-T network 30. A resistor 16 and a capacitor 14 are coupled from the junction of the inductor 12 and the bridged-T network 30 to a point of reference potential (ground). The resistor 16 is a load impedance for the detector 10, and the inductor 12 and the capacitor 14 cooperate to suppress harmonics of the video carrier signal at the detector output. These harmonics would otherwise be coupled back into the radio frequency section of the television receiver, producing interference which is commonly known as "channel 8 beat."

The bridged-T network acts to cancel the intercarrier sound signal from the signals which appear at a terminal 37. The remaining video signals are then coupled to video processing circuitry 22 by a series resistor 18 and an emitter follower coupled transistor 20.

The bridged-T network 30 includes a bridging resistor 36 and serially-coupled capacitors 32 and 34, which are coupled in parallel in the signal path between the detector 10 and the video processing circuitry 22. The serial combination of an adjustable inductor 38 and a resistor 40 is coupled between the junction of capacitors 32 and 34 and a point of reference potential (ground).

The intercarrier sound signal is developed by the bridged-T network 30 at the junction 39 of inductor 38 and resistor 40, and is coupled to the input of a ceramic filter 50. The bandpassed intercarrier sound signal is coupled to an input of a limiter and FM detector circuit 60, which processes the sound information for audio reproduction. A resistor 52 is coupled in shunt with the signal path at the output of the ceramic filter, which matches the output impedance of the filter. The remaining end of the resistor 52 is bypassed to ground by a capacitor 54.

The bridged-T network 30 is tuned to the intercarrier sound frequency by adjustment of inductor 38, and exhibits a trap response at terminal 37 and a peak response at junction 39 as shown in FIGS. 2a and 2b. Waveform 82 of FIG. 2a illustrates the response at terminal 37, with maximum attenuation occurring at the intercarrier sound frequency (4.5 MHz in the NTSC television system). Waveform 84 of FIG. 2b shows the peaked response at the intercarrier sound frequency at junction 39.

In addition to the tuning of the bridged-T network, it is also necessary to ensure that the intercarrier sound signals, which are coupled to the ceramic filter 50, are of a sufficiently high level, and at an impedance level which is consistent with the input requirements of the ceramic filter. In the embodiment of the invention which is shown in FIG. 1, the ceramic filter 50 is assumed to have an input and an output impedance of 1,000 ohms, and the center frequency of the ceramic filter passband (the intercarrier sound frequency) is assumed to be 4.5 MHz. In the following example, these values will be used to illustrate the selection of proper element values for the bridged-T network of FIG. 1.

Figure 3:
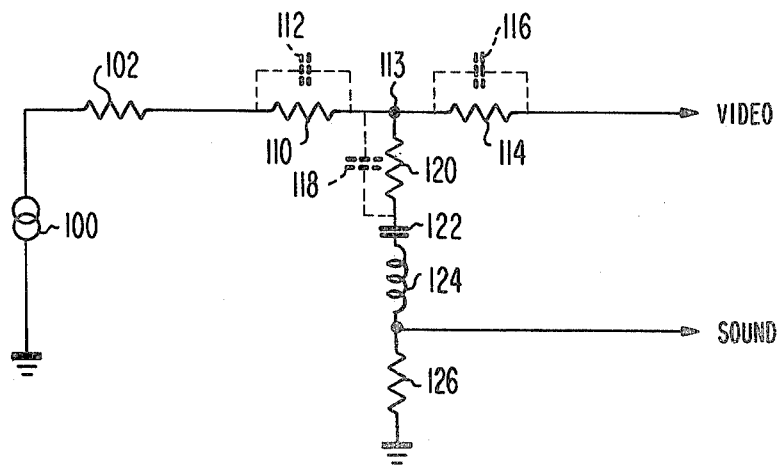
FIG. 3 illustrates in schematic diagram form an equivalent circuit of the signal separation network of FIG. 1.

The operation of the bridged-T network may be understood by referring to the bridged-T equivalent circuit shown in FIG. 3. The network is driven by an idealized current source 100 and a series impedance 102. Resistances 110 and 114 are coupled in series with the video signal path, and each resistance is in parallel with one of capacitances 112 and 116, respectively. The series combination of resistance 120, capacitance 122, inductance 124, and resistance 126 is coupled between the junction 113 of resistances 110 and 114 and ground. A capacitance 118 is coupled in parallel with the resistance 120.

Resistances 110, 114 and 120 have values which are a function of the value of the bridging resistor 36 in FIG. 1. Resistances 110 and 114 are each half the resistance of resistor 36, and resistance 120 has a negative resistance of one-fourth of the value of resistor 36. Capacitances 112, 116 and 118 have values which are related to the values of capacitors 32 and 34 of FIG. 1. These capacitances are drawn in broken lines because they are each shunted by relatively much smaller impedances. For purposes of this example, these broken line capacitances may be neglected.

Capacitor 122 has a value which is equal to the sum of the values of capacitors 32 and 34 in FIG. 1. Inductance 124 represents the inductance of inductor 38, and resistance 126 represents the value of resistor 40 plus the coil losses of inductor 38.

When the bridged-T network is properly tuned, capacitance 122 and inductance 124 present virtually a zero impedance to signals at the intercarrier sound frequency. The impedance of the series path between junction 113 and ground is then determined by the effect of resistances 120 and 126. When the value of resistance 126 is chosen to be equal to the negative resistance of resistance 120, the two resistances cancel each other, and a virtual short circuit is presented by the series path to intercarrier sound signals at junction 113. By selecting component values in this manner, the bridged-T network trap response at terminal 37 of FIG. 1 will have virtually an infinite Q at the intercarrier sound signal frequency, resulting in virtually complete elimination of the intercarrier sound signal from the signals which are applied to the video processing circuitry. Thus, it is seen that the network 30 of FIG. 1 is properly proportioned when the value of resistor 40 plus the losses of inductor 38 is equal to one-fourth the value of the bridging resistor 36.

When the bridged-T network 30 of FIG. 1 was initially constructed and analyzed, the junction 39 at which the ceramic filter was connected was located at the opposite end of inductor 38 at the junction of capacitors 32 and 34. A similar configuration is shown in U.S. patent application Ser. No. 85,311, entitled "SIGNAL SEPARATION NETWORKS," by Walter Gold Gibson, filed concurrently herewith. It was found that, in this configuration, the input impedance of the ceramic filter 50 was in parallel with the inductor 38 and the resistor 40, causing the shunt leg of the bridged-T network to have a complex impedance characteristic. This complex impedance resulted in a degradation of the Q of the network which adversely affected both the video and sound channels. The lower Q caused a broadening of the bandwidth of the intercarrier sound trap 82 at terminal 37. The trapping effect was found to extend into the frequency range of the color subcarrier information, thereby adversely affecting chrominance reproduction. Similarly, the lower Q at the junction of capacitors 32 and 34 resulted in a broadening of the passband 84 at the input to the ceramic filter, which caused a decrease in the rejection of the color subcarrier in the sound channel and increased intermodulation distortion of the color subcarrier and intercarrier sound signals.

In accordance with the principles of the present invention, the ceramic filter 50 is coupled at junction 39 as shown in FIG. 1. The resistive impedance of the shunt leg is simply calculated as the sum of the coil losses of the inductor 38 and the parallel resistance of resistor 40 and the input resistance of the ceramic filter 50. The resistive impedance of the shunt leg in the example shown in FIG. 1 is approximately 200 ohms, which is seen to be one-fourth the value of the bridging resistor 36, as explained in conjunction with FIG. 3. The bridged-T network 30 thus has a high Q, which results in a deeper and narrower trapping effect at terminal 37. The high Q also improves the selectivity of the bandpass effect for the intercarrier sound signal at junction 39, which has a steeper skirts than the initial configuration discussed above.

It may also be noted that the ceramic filter 50 is driven by an impedance which is lower than the 1 K input impedance of the ceramic filter. This lower driving impedance advantageously provides the high Q in the bridged-T network and consequently a higher level signal is supplied to the ceramic filter 50. The mismatched impedances at the input to the ceramic filter do result in a slight amplitude "tilt" across the passband of the ceramic filter, which has been found to cause a few degrees of phase distortion in the detected sound signal. However, this small amount of distortion is negligible by comparison with the hundreds of degrees of phase modulation of the FM sound signal, and is greatly overshadowed by the effective elimination of color subcarrier intermodulation distortion in the sound channel achieved by the arrangement of FIG. 1.

FIG. 4 illustrates an embodiment of the present invention which includes a bridged-T network 44 and an intercarrier sound bandpass filter 70. The remaining elements of FIG. 4 are identical to the comparable elements of FIG. 1 and bear the same reference numerals. The network 44 differs from the network 30 of FIG. 1 in that an additional inductor 42 is coupled in the shunt leg between resistor 40 and the point of reference potential (ground), and the intercarrier sound take-off point is located at the junction of resistor 40 and inductor 42. The junction 39 at the intercarrier sound take-off point is coupled to a parallel LC filter 70, including a capacitor 74 and a tapped inductor 76, by a capacitor 72. The other end of the parallel LC filter 70 is coupled to ground by bypass capacitor 54. The intercarrier sound signal is coupled to the limiter and FM detector 60 from the tap of the inductor 76.

The parallel LC filter 70 is tuned to the intercarrier sound signal frequency so as to provide a bandpassed input signal for the limiter and FM detector 60. It has been found that the LC filter 70 has a broader passband than the ceramic filter 50 of FIG. 1, which results in a decrease in the rejection of the color subcarrier signal in the sound channel. In accordance with a further aspect of the present invention, the inductor 42 of the bridged-T network 44 is coupled in parallel with the input of the LC filter 70. This inductor provides a low impedance path to ground for lower frequency signals at junction 39, which results in improved color subcarrier rejection in the bandpass response at the junction 39. The arrangement of FIG. 4 has been constructed and tested and found to have a color subcarrier signal level at the input to the limiter and FM detector 60 which is 20 to 30 db lower than the intercarrier sound signal level at that point.

In the example of FIG. 4, the value of resistor 40 is illustratively shown as 150 ohms. The shunt leg of the bridged-T network 44 has a resistive impedance of approximately 200 ohms, which is approximately one-fourth the value of the bridging resistor 36. The network 44 thus exhibits a high Q trapping response 82 at terminal 37 and a peaked, narrow passband 84 at the intercarrier sound signal take-off junction 39.

The arrangement of FIG. 4 also provides a higher level intercarrier sound signal to the input of the limiter and FM detector 60 than the arrangement of FIG. 1. It has been found that the intercarrier sound signal experiences approximately a 13 db loss between the output of the detector 10 and the input of the limiter and FM detector 60 in FIG. 1, which is largely due to the 6 db loss imparted to the signal by the ceramic filter. By comparison, the intercarrier sound signal experiences only a 2 db loss between the output of the detector 10 and the input of the limiter and FM detector 60 in the arrangement of FIG. 4, which is due to a 5-6 db gain imparted to the signal by the LC filter.

The LC filter arrangement of FIG. 4 further provides an improvement in ease of assembly as compared to the arrangement of FIG. 1. For instance, the capacitors 72 and 74 and the tapped inductor 76 may be manufactured as a single unitized package, allowing their assembly in one step in the construction of the circuit of FIG. 4. Thus, only two unitary elements, the filter 70 and the capacitor 54, are assembled in the arrangement of FIG. 4, compared with three elements, the ceramic filter 50, the resistor 52, and the capacitor 54, in the arrangement of FIG. 1. The network 44 similarly lends itself to combining elements as unitary assemblies, such as the combination of inductor 38 and capacitors 32 and 34.

What is claimed is:

1. In a television receiver having a common detector for producing, at an output, detected video frequency signal components and an intercarrier sound signal having a given center frequency, means, having an input terminal, for processing said video frequency signal components; means, having an input, for processing said intercarrier sound signal; and a bandpass filter tuned to said intercarrier sound center frequency, exhibiting a given input impedance, and having an input, and an output coupled to the input of said intercarrier sound signal processing means; a network for separating said video and intercarrier sound signal components comprising:

a first signal path coupled between the output of said detector and the input terminal of said video signal processing means;

a second signal path coupled in parallel with said first signal path and including a first reactive impedance element of one sign;

a third signal path, including a second reactive impedance element of an opposite sign, coupled between said second signal path and the input of said bandpass filter; and a fourth signal path coupled between the junction of said third signal path and the input of said bandpass filter and a point of reference potential and having an impedance which is substantially less than the impedance of said third signal path and the given input impedance of said bandpass filter at said intercarrier sound center frequency, such that the input impedance of said bandpass filter has substantially no effect on the response of said network at said input terminal, wherein said first, second, third and fourth signal paths comprise a tuned circuit for attenuating said intercarrier sound signal at said input terminal.

2. In a television receiver having a common detector for producing, at an output, detected video frequency signal components and an intercarrier sound signal having a given frequency, means, having an input terminal, for processing said video frequency signal components; means, having an input, for processing said intercarrier sound signal; and a bandpass filter, tuned to said intercarrier sound frequency and having an input, and an output coupled to the input of said intercarrier sound signal processing means; a network for separating said video and intercarrier sound signal components comprising:

a first signal path coupled between the output of said detector and the input terminal of said video signal processing means;

a second signal path coupled in parallel with said first signal path and including a first reactive impedance element of one sign;

a third signal path, including a second reactive impedance element of an opposite sign, coupled between said second signal path and the input of said bandpass filter; and a fourth signal path coupled between the junction of said third signal path and the input of said bandpass filter and a point of reference potential and having an impedance which is less than the impedance of said third signal path at said intercarrier sound frequency, wherein said first, second, third and fourth signal paths comprise a tuned circuit for attenuating said intercarrier sound signal at said input terminal and wherein said first signal path includes a resistive impedance element having a resistance which is substantially equal to four times the sum of the resistive impedances of said third and fourth signal paths.

3. In a television receiver having a common detector for producing, at an output, detected video frequency signal components and an intercarrier sound signal having a given frequency, means, having an input terminal, for processing said video frequency signal components; means, having an input, for processing said intercarrier sound signal; and a bandpass filter, tuned to said intercarrier sound frequency and having an input, and an output coupled to the input of said intercarrier sound signal processing means; a network for separating said video and intercarrier sound signal components comprising:

a first signal path coupled between the output of said detector and the input terminal of said video signal processing means;

a second signal path coupled in parallel with said first signal path and including a first reactive impedance element of one sign;

a third signal path, including a second reactive impedance element of an opposite sign, coupled between said second signal path and the input of said bandpass filter; and a fourth signal path coupled between the junction of said third signal path and the input of said bandpass filter and a point of reference potential and having an impedance which is less than the impedance of said third signal path at said intercarrier sound frequency, wherein said first, second, third and fourth signal paths comprise a tuned circuit for attenuating said intercarrier sound signal at said input terminal and wherein said bandpass filter comprises a ceramic filter.

4. The combination of claim 3, wherein:

said fourth signal path comprises a resistive impedance element and wherein said second reactive impedance element of said third signal path and said resistive impedance element of said fourth signal path are serially coupled in that order between said second signal path and said point of reference potential.

5. In a television receiver having a common detector for producing, at an output, detected video frequency signal components and an intercarrier sound signal having a given frequency, means, having an input terminal, for processing said video frequency signal components; means, having an input, for processing said intercarrier sound signal; and a bandpass filter, tuned to said intercarrier sound frequency and having an input, and an output coupled to the input of said intercarrier sound signal processing means; a network for separating said video and intercarrier sound signal components comprising:

a first signal path coupled between the output of said detector and the input terminal of said video signal processing means;

a second signal path coupled in parallel with said first signal path and including a first reactive impedance element of one sign;

a third signal path, including a second reactive impedance element of an opposite sign, coupled between said second signal path and the input of said bandpass filter; and a fourth signal path coupled between the junction of said third signal path and the input of said bandpass filter and a point of reference potential and having an impedance which is less than the impedance of said third signal path at said intercarrier sound frequency, wherein said first, second, third and fourth signal paths comprise a tuned circuit for attenuating said intercarrier sound signal at said input terminal and wherein said bandpass filter comprises a parallel LC circuit.

6. The combination of claim 5, wherein:

said third signal path further includes a resistive impedance element and said fourth signal path comprises an inductive impedance element, and wherein said second reactive impedance element, said resistive impedance element and said inductive impedance element are serially coupled in that order between said second signal path and said point of reference potential.

7. The combination of claim 4 or 6, wherein:

said second reactive impedance element comprises an adjustable reactive impedance element for tuning said tuned circuit.

8. In a television receiver having a common detector for producing, at an output, detected video frequency signal components and an intercarrier sound signal having a given frequency, means, having an input terminal, for processing said video frequency signal components; means, having an input, for processing said intercarrier sound signal; and a bandpass filter, tuned to said intercarrier sound frequency and having an input, and an output coupled to the input of said intercarrier sound signal processing means; a network for separating said video and intercarrier sound signal components comprising:

first and second parallel signal paths coupled between the output of said detector and the input terminal of said video signal processing means;

a third signal path, including a reactive impedance element and a resistive impedance element, coupled between said second signal path and a point of reference potential; and means, independent of said reactive impedance element, for coupling said resistive impedance element of said third signal path in parallel with the input of said bandpass filter, wherein said first, second, and third signal paths comprise a tuned circuit for attenuating said intercarrier sound signal at said input terminal.

9. In a television receiver having a common detector for producing, at an output, detected video frequency signal components and an intercarrier sound signal occupying a given frequency range, means, having an input terminal, for processing said video frequency signal components; means, having an input, for processing said intercarrier sound signal; and a bandpass filter, tuned to a frequency of said intercarrier sound frequency range, exhibiting a given input impedance, and having an input, and an output coupled to the input of said intercarrier sound signal processing means; a network for separating said video and intercarrier sound signal components comprising:

first and second parallel signal paths coupled between the output of said detector and the input terminal of said video signal processing means;

a third signal path including a resistive impedance element and an inductive impedance element, coupled between said second signal path and a point of reference potential; and means, independent of said resistive impedance element, for coupling said inductive impedance element of said third signal path in parallel with the input of said bandpass filter, said inductive impedance element exhibiting an impedance which is less than said given input impedance at the tuned frequency of said bandpass filter, wherein said first, second, and third signal paths comprise a tuned circuit for attenuating said intercarrier sound signal at said input terminal and for attenuating signals having frequencies less than said given frequency range at the input of said bandpass filter.

* * * * *

UNITED STATES PATENT AND TRADEMARK OFFICE
CERTIFICATE OF CORRECTION

PATENT NO. : 4,376,953

DATED : March 15, 1983

INVENTOR(S) : Saiprasad Vasudev Naimpally

It is certified that error appears in the above-identified patent and that said Letters Patent is hereby corrected as shown below:

On the title page Insert:

--(73) Assignee: RCA Corporation, New York, N. Y. --

On the title page, after the name of the Primary Examiner insert -- Attorney, Agent or Firm -- P.J. Rasmussen, W.H. Meagher and W. B. Yorks, Jr. --.

Signed and Sealed this

Nineteenth Day of July 1983

[SEAL]

Attest:

GERALD J. MOSSINGHOFF

Attesting Officer     Commissioner of Patents and Trademarks